United States Patent
Tahan et al.

(10) Patent No.: US 8,353,040 B2
(45) Date of Patent: Jan. 8, 2013

(54) AUTOMATIC EXTRACTION OF SIGNATURES FOR MALWARE

(76) Inventors: Gil Tahan, Omer (IL); Asaf Shabtai, Carne Yosef (IL); Yuval Elovici, Arugot (IL)

(*) Notice: Subject to any disclaimer, the term of this patent is extended or adjusted under 35 U.S.C. 154(b) by 1044 days.

(21) Appl. No.: 12/031,832

(22) Filed: Feb. 15, 2008

(65) Prior Publication Data
US 2008/0201779 A1     Aug. 21, 2008

(30) Foreign Application Priority Data
Feb. 19, 2007    (IL) ......................................... 181426

(51) Int. Cl.
*G06F 15/18*    (2006.01)
*G06F 11/00*    (2006.01)

(52) U.S. Cl. ................. 726/24; 726/22; 726/25; 714/48
(58) Field of Classification Search ............... 726/22–26
See application file for complete search history.

(56) References Cited

U.S. PATENT DOCUMENTS

| | | | |
|---|---|---|---|
| 5,452,442 A | 9/1995 | Kephart | |
| 6,487,666 B1* | 11/2002 | Shanklin et al. | 726/23 |
| 7,234,167 B2* | 6/2007 | Teblyashkin et al. | 726/24 |
| 7,409,717 B1* | 8/2008 | Szor | 726/24 |
| 7,574,742 B2* | 8/2009 | Yang et al. | 726/24 |
| 7,634,810 B2* | 12/2009 | Goodman et al. | 726/22 |
| 7,639,714 B2* | 12/2009 | Stolfo et al. | 370/474 |
| 8,201,244 B2* | 6/2012 | Sun et al. | 726/22 |
| 2003/0023865 A1* | 1/2003 | Cowie et al. | 713/200 |
| 2004/0039921 A1* | 2/2004 | Chuang | 713/187 |
| 2004/0133796 A1* | 7/2004 | Cohen et al. | 713/200 |
| 2005/0027686 A1* | 2/2005 | Shipp | 707/3 |
| 2005/0071649 A1* | 3/2005 | Shipp | 713/188 |
| 2005/0108562 A1* | 5/2005 | Khazan et al. | 713/200 |
| 2006/0015630 A1* | 1/2006 | Stolfo et al. | 709/230 |
| 2006/0212942 A1* | 9/2006 | Barford et al. | 726/24 |
| 2007/0083513 A1* | 4/2007 | Cohen et al. | 707/6 |

(Continued)

FOREIGN PATENT DOCUMENTS
EP    1494427    1/2005
(Continued)

OTHER PUBLICATIONS

Weber, M. et al: "A toolkit for . . . software" Computer Security Applications Conference, IEEE, Dec. 9-13, 2002; pp. 423-431, XP010627054.

(Continued)

*Primary Examiner* — Linglan Edwards
(74) *Attorney, Agent, or Firm* — Roach Brown McCarthy & Gruber, P.C.; Kevin D. McCarthy

(57) ABSTRACT

Method for the automatic generation of malware signatures from computer files. A common function library (CFL) created, wherein the CFL contains any functions identified as a part of the standard computer language used to write computer files which are known as not containing malware. The functions of a computer file which does contain a malware are extracted and the CFL is updated with any new common functions if necessary, such that the remaining functions are all considered as candidates for generating the malware signature. The remaining functions are divided into clusters according to their location in the file and the optimal cluster for generating the malware signature is determined. One or more of the functions in the optimal cluster is selected randomly, as the malware signature.

13 Claims, 2 Drawing Sheets

U.S. PATENT DOCUMENTS

2007/0180528 A1* 8/2007 Kane .............................. 726/24
2008/0127336 A1* 5/2008 Sun et al. ....................... 726/22

FOREIGN PATENT DOCUMENTS

EP 1742151 1/2007
GB 2391965 2/2004

OTHER PUBLICATIONS

Lemos, R, Counting the Cost of Slammer, CNET news.com. http://news.com.com/2100-1001-982955.html, Jan. 2003.

Yong Tang, Shigang Chen, Defending Against Internet Worms: A Signature-Based Approach, in Proc. of IEEE INFOCOM'05, Miami, Florida, USA, May 2005.

Ke Wang and Salvatore J. Stolfo, "Anomalous payload-based network intrusion detection", in Recent Advance in Intrusion Detection (RAID), Sep. 2004.

David Brumley, et al., "Towards Automatic Generation of Vulnerability-Based Signatures", in the Proceedings of the 2006 IEEE Symposium on Security and Privacy.

N. Provos, "A virtual Honeypot Framework," Center for Info. Tech. Integration, Univ. of Michigan, Ann Arbor, Michigan, USA, Tech. Rep. CITI Tech. Rep. 03-1, Oct. 2003.

Kim, H.-A. et al., "Autograph: Toward Automated, Distributed Worm Signature Detection", in Proc. of the 13th Usenix Security Symp. (Security 2004), San Diego, CA, Aug. 2004.

Vinod Yegneswaran et al., "An architecture for generating semantics-aware signatures in 14th USENIX Security Symposium", Baltimore, Maryland, Aug. 2005.

Mihai Christodorescu, et al., "Semantics-aware malware detection" in IEEE Symposium on Security and Privacy, Oakland, California, May 2005.

Statically linked libraries; http://en.wikipedia.org/wiki/Statically_linked_library, Jul. 2008.

* cited by examiner

AUTOMATIC EXTRACTION OF SIGNATURES FOR MALWARE

CLAIM OF PRIORITY

This application claims priority to Israeli patent application number 181426, filed on Feb. 19, 2007.

FIELD OF THE INVENTION

The present invention relates to the field of network security. Specifically, this invention relates to automatic extraction of signatures for malware, which can be later used in order to identify files which are infected with malware.

BACKGROUND OF THE INVENTION

During recent years, the number of malware attacks on computer networks has increased dramatically, as has the dependence of companies and government agencies on their computer networks. Consequently, many efforts are made in order to provide computer and data protection in multi-connectivity data networks.

A single malware (malicious software) in a computerized system, intruding the system from the computer network, can result in the loss and/or unauthorized utilization and/or modification of large amounts of data. As a case in point, the total cost of the Code Red worm epidemic, as measured in lost productivity owing to interruptions in computer and network services, is estimated at $2.6 billion (Lemos, R, Counting the Cost of Slammer, CNET news, January 2003).

Many malware protection methods rely on malware signatures generated from malware-containing files. Generally, such signatures are compared to the code of any file traveling on the internet, and if similar segments of code are found in any file, that file is forbidden continued progress across the internet.

Automated signature generation for new attacks of this type is extremely difficult due to several reasons (Yong Tang, Shigang Chen, Defending Against Internet Worms: A Signature-Based Approach, in Proc. of IEEE INFOCOM'05, Miami, Fla., USA, May 2005). First, in order to create an attack signature, the attack traffic must be isolated from the legitimate traffic, which is not an easy task in all situations. Second, the signature generation must be general enough to capture all attack traffic of certain type but still be specific enough to avoid overlapping with the contents of normal traffic. Nowadays, the above problems are handled in an ad-hoc manner, based on human judgment. As a case in point, current rule-based network Intrusion Detection Systems (IDS) can do little to stop zero-day worms (Ke Wang and Salvatore J. Stolfo, "anomalous payload-based network intrusion detection", in Recent Advance in Intrusion Detection (RAID), September 2004). Such systems depend upon signatures only known after the worm has been launched successfully, essentially disclosing its contents and method of infection for later deployment.

Various techniques have been proposed to derive malware signatures automatically, including among others: Vulnerability-based Signatures (David Brumley, et al., "Towards Automatic Generation of Vulnerability-Based Signatures", in the Proceedings of the 2006 IEEE Symposium on Security and Privacy); Payload-based Signatures (Ke Wang and Salvatore J. Stolfo, "anomalous payload-based network intrusion detection", in Recent Advance in Intrusion Detection (RAID), September 2004; Kim, H.-A. and Karp, B., "Autograph: Toward Automated, Distributed Worm Signature Detection", in Proceedings of the 13th Usenix Security Symposium (Security 2004), San Diego, Calif., August, 2004); Semantic-Aware Signatures (Vinod Yegneswaran et al., "An architecture for generating semantics-aware signatures in 14th USENIX Security Symposium", Baltimore, Md., August 2005); The Amd Algorithm (Mihai Christodorescu, et al., "Semantics-aware malware detection" in IEEE Symposium on Security and Privacy, Oakland, Calif., May 2005) and Honeypot-based Signatures (Yong Tang, Shigang Chen, Defending Against Internet Worms: A Signature-Based Approach, in Proc. of IEEE INFOCOM'05, Miami, Fla., USA, May 2005).

One of the main drawbacks of the prior art techniques, including those listed above, is that they tend to overemphasize the protection against recent worm epidemics and do not provide a general-purpose technique which can handle other types of malware as well. Moreover, signatures generated by the prior art techniques examine suspicious code by modeling malicious patterns in communication packets, payloads, unsuccessful connections, sessions and code structure (templates). Such signatures were tested and reported to be effective for small-sized malware. Nevertheless, they ignore the fact that many types of malware appear as full-fledged executable and therefore contain a significant portion of common-code emanating from the development tools and software packages used by the malware authors. Such common code is fixed across malware instances due to the fact that hackers usually repeatedly exploit a "toolbox" including a set of functions which enable them to generate various malware instances. Since signature-based systems do not examine malware at the executable level and do not account for these common code segments, which can be quite large, the quality of the signature generation mechanisms is dubious. Such quality is measured using the following criteria: sensitivity (low false negative for malware) and specificity (low false positive for innocuous traffic).

In the art there have been developed several methods aiming at expediting the process of signature generation for the effective containment of worms. "Autograph" (Kim, H.-A. and Karp, B., "Autograph: Toward Automated, Distributed Worm Signature Detection", in Proceedings of the 13th Usenix Security Symposium (Security 2004), San Diego, Calif., August, 2004), for example, stores source and destination addresses of each inbound unsuccessful TCP connection it observes. Once an external host has made unsuccessful connection attempts to more than a predetermined number of internal IP addresses, the flow classifier considers it to be a scanner. All successful connections from an IP address flagged as scanners are classified as suspicious, and their inbound packets written to the suspicious flow pool. In the next stage "Autograph" selects the most frequently occurring byte sequences across the flows in the suspicious flow pool and stores them as signatures. At the beginning of a worm's propagation, the aggregate rate at which all infected hosts scan the IP address space is relatively low. However, since "Autograph" relies on "overhearing" unsuccessful scans to identify suspicious source IP addresses, early in an epidemic an "Autograph" monitor is slow to accumulate suspicious addresses, and in turn slow to accumulate worm payloads. To address this problem "Autograph" uses a tattler that, as its name suggests, shares suspicious source addresses among all monitors, toward the goal of accelerating the accumulation of worm payloads.

Tang and Chen (Yong Tang, Shigang Chen, Defending Against Internet Worms: A Signature-Based Approach, in Proc. of IEEE INFOCOM'05, Miami, Fla., USA, May 2005) addressed the above problems by designing a double-honeypot system (N. Provos, "A virtual Honeypot Framework," Center for Information Technology Integration, University of Michigan, Ann Arbor, Mich., USA, Tech. Rep. CITI Technical Report 03-1, October 2003). Their system is deployed in a local network for automatic detection of worm attacks from the Internet. It should be noted that this system is not suitable for a large ISP environment.

Two further algorithms, based on Expectation-Maximization (C. E. Lawrence and A. A. Reilly, "An Expectation Maximization (EM) Algorithm for the Identification and Characterization of Common Sites in Unaligned Biopolymer Sequences," *PROTEINS:Structure, Function and Genetics*, vol. 7, pp. 41-51, 1990) and Gibbs sampling (C. E. Lawrence, et al., "Detecting Subtle Sequence Signals: A Gibbs Sampling Strategy for Multiple Alignment," Science, vol. 262,pp. 208-214, October 1993), were proposed for efficient computation of Position Aware Distribution Signature (PADS). Experiments based on variants of the MS-Blaster worm were performed. The results showed that the signature-based defense system can accurately separate new variants of the worm from the normal background traffic by using the PADS signature derived from the past samples.

The main drawback common to all of the automatic signature generation techniques mentioned above is that they are appropriate for instances of short, stream-based, worms such as Nimda, Code Red/Code Red II, MS Blaster (1.8 KB long), Sober, Netsky and B[e]agle. Larger malware files carrying full-fledged applications usually contain many code segments used by the development platform which was implemented to generate the malware instance. Those segments are not unique to the malware. As a result, selecting a signature that will be both sensitive and specific is a very challenging task for the above-mentioned techniques, when the file comprising the malware is relatively large.

It would therefore be highly desirable to develop an automatic signature extraction method that would account for the common code segments. Such a method would be able to detect malware appearing in small, as well as large, files. The types of malware which could be detected by such a method include Trojan horses, spyware, adware, viruses, and worms operating in a Windows environment.

It is the object of the present invention to provide a method by which malware signatures are essentially automatically extracted.

It is a further object of the present invention to provide a method which is suitable to extract signatures from large files.

It is yet a further object of the present invention to provide a method with low false negative for malware, as well as low false positive for innocuous traffic.

Further purposes and advantages of this invention will become apparent as the description proceeds.

SUMMARY OF THE INVENTION

The present invention is directed to a method for the automatic generation of malware signatures from computer files. A common function library (CFL) created, wherein the CFL contains any functions identified as a part of the standard computer language used to write computer files which are known as not containing malware. The functions of a computer file which does contain a malware are extracted and the CFL is updated with any new common functions if necessary, such that the remaining functions are all considered as candidates for generating the malware signature. The remaining functions are divided into clusters according to their location in the file and the optimal cluster for generating the malware signature is determined. One or more of the functions in the optimal cluster is selected, e.g., randomly, as the malware signature.

The CFL may be created by importing a large number of files containing no malware code into a function extractor and processing each file in the function extractor so as to identify and extract as many functions as possible from each file's code. Then the functions extracted from the different files are compared, where the functions which appear in more than one file are considered to be common. The common functions are then transferred and stored in the CFL for later reference.

The functions may be identified and extracted using an appropriate disassembly software application, such as IDA Pro and a dedicated plug-in that scans the output of the IDA Pro application, normalizes the functions, and stores them in a database.

The normalization feature of IDA Pro is used for eliminating the references which may cause similar functions, found in different files, to seem different.

In one aspect, the functions are identified and extracted implementing a state machine, by manually or automatically comparing the binary code of a large number of computer files to the corresponding assembly representation, thereby allowing the identification of repeating patterns which represent the beginning or end of functions; by applying the state machine, wherein the state machine is able to identify the repeating patterns in the binary code that represent the beginnings and ends of function, on any incoming file thereby identifying functions in the binary code of each the incoming file; and by comparing the identified functions using a similarity test that can employ a similarity threshold, thereby determining which of the identified functions are common functions.

The functions of a computer file which does contain a malware may be extracted by using a disassembly software application or a state machine.

The functions may be divided into clusters by considering all possible clusters of the functions. Preferably, the optimal cluster is the cluster with the highest cluster score according to:

$$ClusterScore = \frac{Cs}{Fs} + \frac{Fc}{T} + \frac{Fl}{Cs},$$

wherein
where Cs denotes the cluster size in bytes;
Fs denotes the entire file's size;
Fc denotes the number of functions in the cluster;
T denotes the total number of functions in the file; and
Fl denotes the sum of the functions length in the cluster.

An offset may be added to one of the functions selected as the malware signature. The selection of the malware signature from the best cluster may performed according to the entropy of the selected segment, wherein the segment selected has the maximal entropy.

All the above and other characteristics and advantages of the invention will be further understood through the following illustrative and non-limitative description of preferred embodiments thereof.

DETAILED DESCRIPTION OF PREFERRED EMBODIMENTS

In order to address the disadvantages of the prior art methods related to hereinabove, the present invention proposes a novel method for signature generation which can be used for tagging malware.

The method of the present invention employs an executable-analysis technique which sanitizes instances of malicious executables from any segment of common code. The malicious executables are stripped of any such segments and a unique signature, which can be later used for detection of suspicious traffic, is generated.

In order to create and employ signatures for effective and efficient detection of malware in executables, the method of the present invention requires that the generated signature comply with the following requirements: (1) the signature generated by the present invention is sufficiently long to be unique among billions of benign executables, therefore providing the signature with high specificity; (2) the signature generated according to the present invention is sufficiently short to decrease the problems of Internet packet splits and detection hardware storage limitations; (3) the signature generated according to the method of the present invention is simple in order to be detected in real-time from the Internet data stream; (4) the signature is well defined to enable totally automatic generation thereof.

When generating a malware signature it is necessary to locate a segment, or segments, of the data which is unique to the malware only. Since many malwares are developed using higher level languages (such as: C++, C, visual basic, Delphi, etc.) a large part of the malware containing files is not unique. As mentioned above, one of the drawbacks of the methods of the prior art is that they do not relate to these non-unique segments, and are thus able to create malware signatures only from relatively small files.

In contrast, the method of the present invention initially strips the unique malware segments from the non-unique segments, related to the computer language used to write the file. The non-unique segments are referred to herein as "common functions", and the first step of the method of the present invention is to create a Common Function Library (CFL). According to the present invention the CFL is dynamic, and whenever new common functions are identified they are added to the CFL. Taking the common functions found in the CFL into account reduces the risk of selecting non-unique segments of code as part of the malware signature, thereby enhancing the abilities of the malware signature in detecting incoming malware files of the same type.

Figure 1:
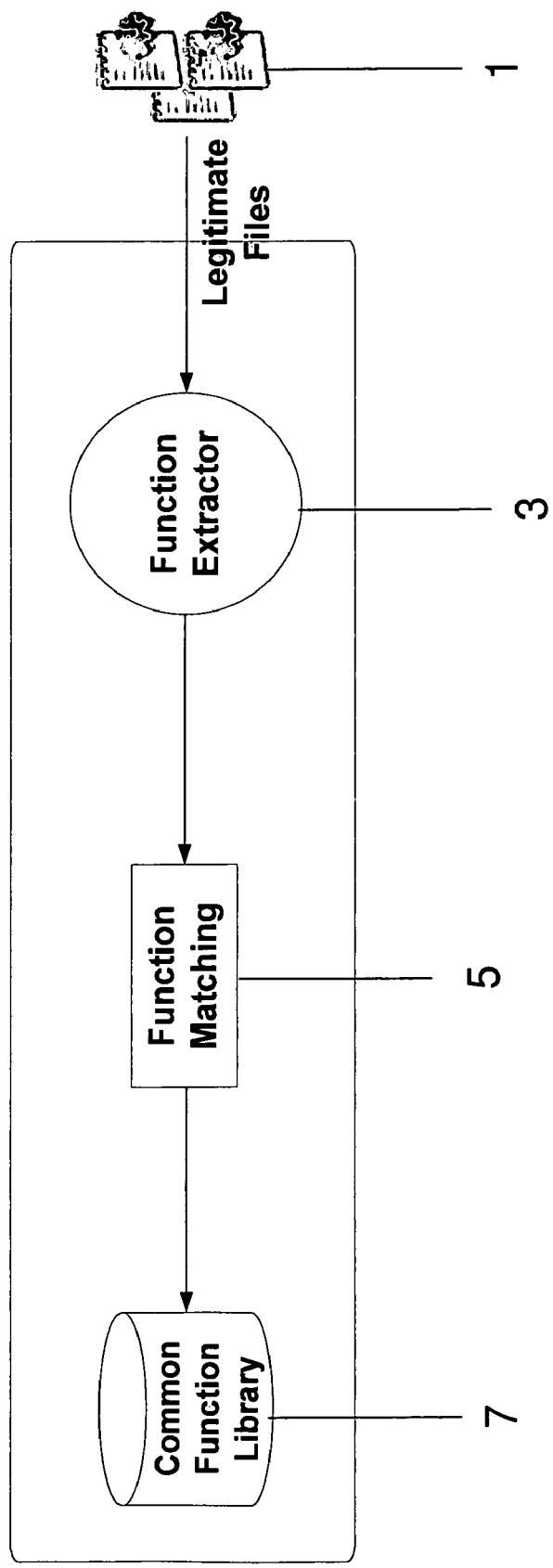
FIG. 1 shows an outline of the CFL creation.

According to the present invention the CFL is constructed as shown in FIG. 1. In order to initiate the creation of the CFL, as large number of legitimate files (1), i.e., files clean of malware code, are imported into a function extractor (3). The function extractor processes each file, and as many as possible of the functions comprised therein are identified and extracted from the code. The extracted functions then proceed to the function matching stage (5), in which functions that appear in more than a single file are considered to be common. The common functions are transferred to the CFL database (7), and stored there for later reference.

According to the present invention two approaches can be used in order to identify and extract functions from the file code. The first is disassembly using an appropriate software application, preferably IDA Pro and extracting functions, and the second is extracting functions using state machine.

When identifying functions using IDA Pro (or any other appropriate application), each incoming file is first disassembled by the IDA Pro program and then functions from statically linked libraries are identified. The dedicated plug-in of the present invention scans the output of the IDA Pro application (i.e. all detected functions), normalizes the functions, and stores them in a database.

The common functions, i.e., the functions that appear in several files, are then transferred to the CFL database. However, a function in different executable files may have a different binary representation, thus it is necessary to determine when functions are considered to be the same. A call for a function is usually represented by a command that contains a reference. Due to linking issues the reference, and thus the binary representation of the same function in different executables is usually different. Therefore, the normalization feature of IDA Pro is used, thereby eliminating the references, thus identical functions are identified as such.

As mentioned hereinabove, the CFL is a dynamic database. Accordingly, if at any later stage a common function, that does not already exist in the CFL, is identified, that function is added to the CFL database.

The second approach to identifying and extracting functions according to the present invention is by implementing a state machine. The state machine used according to the present invention is able to identify most of the functions that reside in an executable file without disassembling it.

According to the present invention the binary code of a large number of programs is compared, either manually or automatically, with the corresponding assembly representation. For example, the sequence of instructions on the right hand side below is a common beginning of a function in assembly language. The corresponding binary code is found on the left hand side.

```
55 8B EC    ⟷    push    ebp
                  mov     ebp, esp
```

Such a comparison allows the identification of repeating patterns that represent the beginning/end of functions. These patterns can be represented as a state-machine which can then be applied on any incoming file, and is able to identify functions in the binary code of that file. Regarding the example above, the state machine identifies that the binary sequence "55 8B EC" represents the beginning of a function. Furthermore, the state machine according to the present invention is able to identify such a sequence in the binary code of any arbitrary file.

By using the state-machine approach described above the beginning and the end of a function can be identified, but the reference attached to that function, which may be different in different executables, cannot be identified. Thus, when identifying functions using a state machine, in order to determine whether two given functions are close enough to be assumed as same function, regardless of the references changes and its offset in a file, a similarity test is used.

The most simple similarity test that can be used in the present invention employs a similarity threshold. If the number of different bytes exceeds the threshold then the two functions are considered different. For example, if the threshold is 3, the two functions below are considered to be different functions, but if the threshold is greater that 4, they are considered to be the same. According to the present invention, the threshold is determined by trial and error.

Function X in File1:
8B D8 8B D6 8B C3 E8 F5 CD FF FF 89 73 1C 5E 5B
Function X in File2:
8B D8 8B D6 8B C3 E8 DD E5 FF FF 89 43 38 5E 5B Once the CFL is constructed as described hereinabove using only "clean" files, i.e., files containing no malware, a malware signature must be generated from a file which contains a malware, hidden among "clean" sections of code.

In the signature generation stage of the method of the present invention, the functions in an incoming file, which contains a malware, are extracted using one of the methods described hereinabove. Each of the functions is compared to the functions of the CFL, identifying a portion of the functions as common functions. The common functions are then filtered out of the system, and the CFL is updated if necessary. The remaining functions become candidates for generating the malware signature.

As known to those familiar with the art, a malware signature must be unique. In order to increase the uniqueness of the generated malware signature the following constraints are used when choosing the segment/segments of the remaining functions which are defined as the signature:
1) the segment is unique to the malware;
2) the segment has high entropy, i.e., the bytes of the segment are not repetitive; and
3) the segment is not a text.

The above constraints are essential especially since even after identifying all of the common functions in an incoming file, there may still be large segments of code that are not accounted for. These constraints assist in choosing the optimal segment/segments for the malware signature.

In another embodiment of the present invention, in order to increase the uniqueness of the signature, an offset is added to all of the candidate functions.

The final step of the method of the present invention relates to the selection of the function from which the signature is to be generated, while taking the above constraints into account, and optionally adding an offset.

Figure 2:
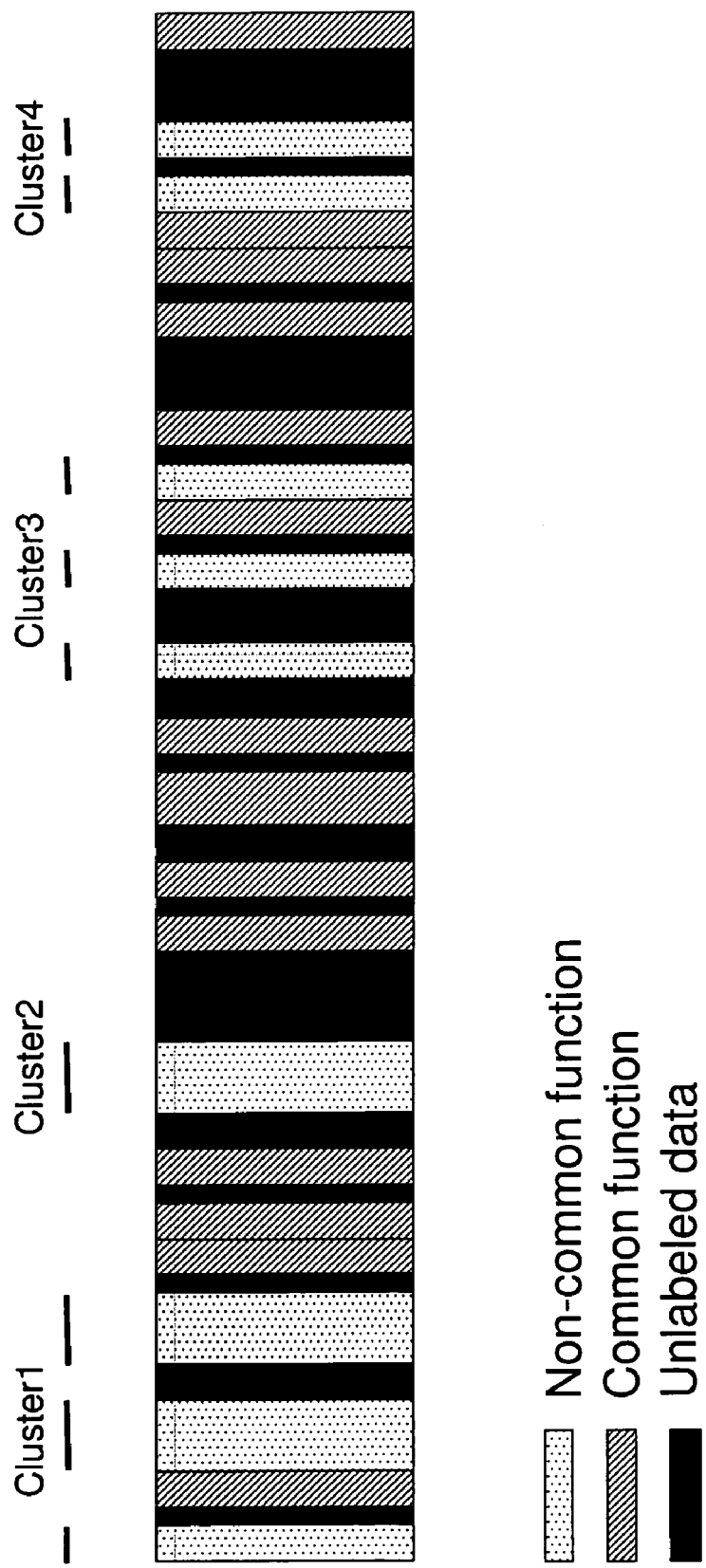
FIG. 2 illustrates the clusters formed in a file's code.

As mentioned above, the function from which the signature is created is selected from the functions remaining after the common functions have been filtered out. It is assumed that common linkers create a tightly grouped function cluster from the programmer's unique code. This unique code cluster is most likely to represent the unique description of the malware. Therefore, according to the present invention the remaining functions are processed and identified according to the clusters in which they physically lay in the executable file. In one embodiment of the present invention, all possible clusters of the remaining functions are considered. The best cluster for generating the malware signature is then chosen. An example of clusters created in a file's code, once it has been separated into common functions, non-common functions, and unlabeled data, can be seen in FIG. 2.

In one embodiment of the present invention the clusters are graded based on the following function:

$$ClusterScore = \frac{Cs}{Fs} + \frac{Fc}{T} + \frac{Fl}{Cs}$$

wherein,
Cs denotes the Cluster size in bytes
Fs denotes the entire File's Size
Fc denotes the number of functions in cluster
T denotes the total number of function in file
Fl denotes the sum of the function's length in cluster The cluster with the highest cluster score is then chosen as the one from which the signature is to be generated.

Once the best cluster has been selected, the signature generator of the present invention selects one of the functions of that cluster, optionally adding an offset to the selected function.

According to one embodiment of the present invention the function selected from the best cluster as the signature is selected randomly. According to a preferred embodiment of the present invention the function with the highest entropy is selected. Choosing a function with high entropy lowers the probability of selecting a data section as the signature.

The selected function, possibly with its offset, is the malware signature. As would be understood by those familiar with the art, the offset of a function may contain segments of uncommon functions, unidentified code, as well as common functions. By using the clustering score mentioned above, the chances that the offset comprises part of a common function are reduced to a minimum. This increases the uniqueness of the selected malware signature.

In another embodiment of the present invention more than one function can be selected for generating the signature, so that the signature consists of two or more byte strings.

The present invention relates also to a method for identifying whether arbitrary files are, or contain, malware codes. Once such files are identified, a malware signature is generated therefrom.

Another aspect of the present invention relates to a method for generating generic malware signatures, so that each signature is able to identify as many malware codes as possible. According to this method a "malware common function library" is constructed, and later implemented, in order to store various malware codes, and to generate generic signatures based upon them. As known to those familiar with the art, different malware codes that were generated by the same malware generator/malware toolbox are very likely to comprise common functions. Therefore, the method of the present invention is extremely useful for generating generic signatures for such malware codes. However, as would be understood by those familiar with the art, the method of the present invention is able to derive generic signatures for any malware codes, developed on any platforms, wherein the different malware codes comprise common functions.

Although embodiments of the invention have been described by way of illustration, it will be understood that the invention may be carried out with many variations, modifications, and adaptations, without departing from its spirit or exceeding the scope of the claims.

The invention claimed is:

1. A method for the automatic generation of malware signatures from computer files, said method comprising:
   a) creating a common function library (CFL), wherein said CFL contains any functions of a computer file, which functions are identified as being part of a standard computer language used to write computer files which are known as not containing malware;
   b) extracting the functions of a computer file which does contain a malware;
   c) identifying common functions from the extracted functions, the common functions are known as not being part of a malware;
   d) filtering out the common functions from the extracted functions, the remaining functions are all considered as candidates for generating the malware signature;

e) dividing said remaining functions into a multitude of clusters according to their location in said file;

f) determining an optimal cluster from the multitude of clusters for generating the malware signature, the optimal cluster is the cluster with the highest cluster score according to:

$$ClusterScore = \frac{Cs}{Fs} + \frac{Fc}{T} + \frac{Fl}{Cs},$$

wherein

Cs denotes the cluster size in bytes;
Fs denotes the entire file's size;
Fc denotes the number of functions in said cluster;
T denotes the total number of functions in said file; and
Fl denotes the sum of the functions length in said cluster; and g) selecting at least one of the functions in said optimal cluster as the malware signature;

the CFL is created by:
  i) importing a number of files containing no malware code into a function extractor;
  ii) processing each file in said function extractor so as to identify and extract as many functions as possible from each file's code;
  iii) comparing the functions extracted from the different files, wherein the functions which appear in more than one file are considered to be common; and
  iv) transferring and storing said common functions into the CFL for later reference.

2. The method according to claim 1 wherein the functions are identified and extracted using a disassembly software application and a dedicated plug-in.

3. The method according to claim 2 wherein the disassembly software application is IDA Pro.

4. The method according to claim 2 wherein the dedicated plug-in scans the output of the disassembly software application, normalizes said functions, and stores them in a database.

5. The method according to claim 3 wherein the normalization feature of IDA Pro is used for eliminating the references which may cause similar functions, found in different files, to seem different.

6. The method according to claim 1 wherein the functions are identified and extracted implementing a state machine, by the following steps:
  a) comparing the binary code of a number of computer files to the corresponding assembly representation, thereby allowing the identification of repeating patterns which represent the beginning or end of functions;
  b) applying said state machine, wherein said state machine is able to identify the repeating patterns in the binary code that represent the beginnings and ends of function, on any incoming file thereby identifying functions in the binary code of each said incoming file; and
  c) comparing said identified functions using a similarity test, thereby determining which of said identified functions are common functions.

7. The method according to claim 6 wherein step (a) is performed manually.

8. The method according to claim 6 wherein step (a) is performed automatically.

9. The method according to claim 6 wherein the similarity test employs a similarity threshold.

10. The method according to claim 1 wherein step (b) is conducted implementing:
  a) a disassembly software application, and a dedicated plug-in which scans the output of the disassembly software application, normalizes said functions, and stores them in a database, wherein the normalization feature of the disassembly software application is used for eliminating the references which may cause similar functions, found in different files, to seem different; or
  b) using a state machine for:
    i) comparing the binary code of a computer file to the corresponding assembly representation, thereby allowing the identification of repeating patterns which represent the beginning or end of functions;
    ii) applying said state machine to identify the repeating patterns in the binary code that represent the beginnings and ends of function on the computer file, thereby identifying functions in the binary code of the computer file.

11. The method according to claim 1 wherein an offset is added to at least one of the functions selected as the malware signature.

12. The method according to claim 1 wherein the selection of the malware signature from the cluster is performed randomly.

13. The method according to claim 1 wherein the selection of the malware signature from the optimal cluster is performed according to the entropy of the selected segment, wherein the segment selected has the maximal entropy.

* * * * *